P. C. THOMPSON.
EYE SHADE.
APPLICATION FILED OCT. 20, 1914.
1,166,493.
Patented Jan. 4, 1916.
2 SHEETS—SHEET 1.
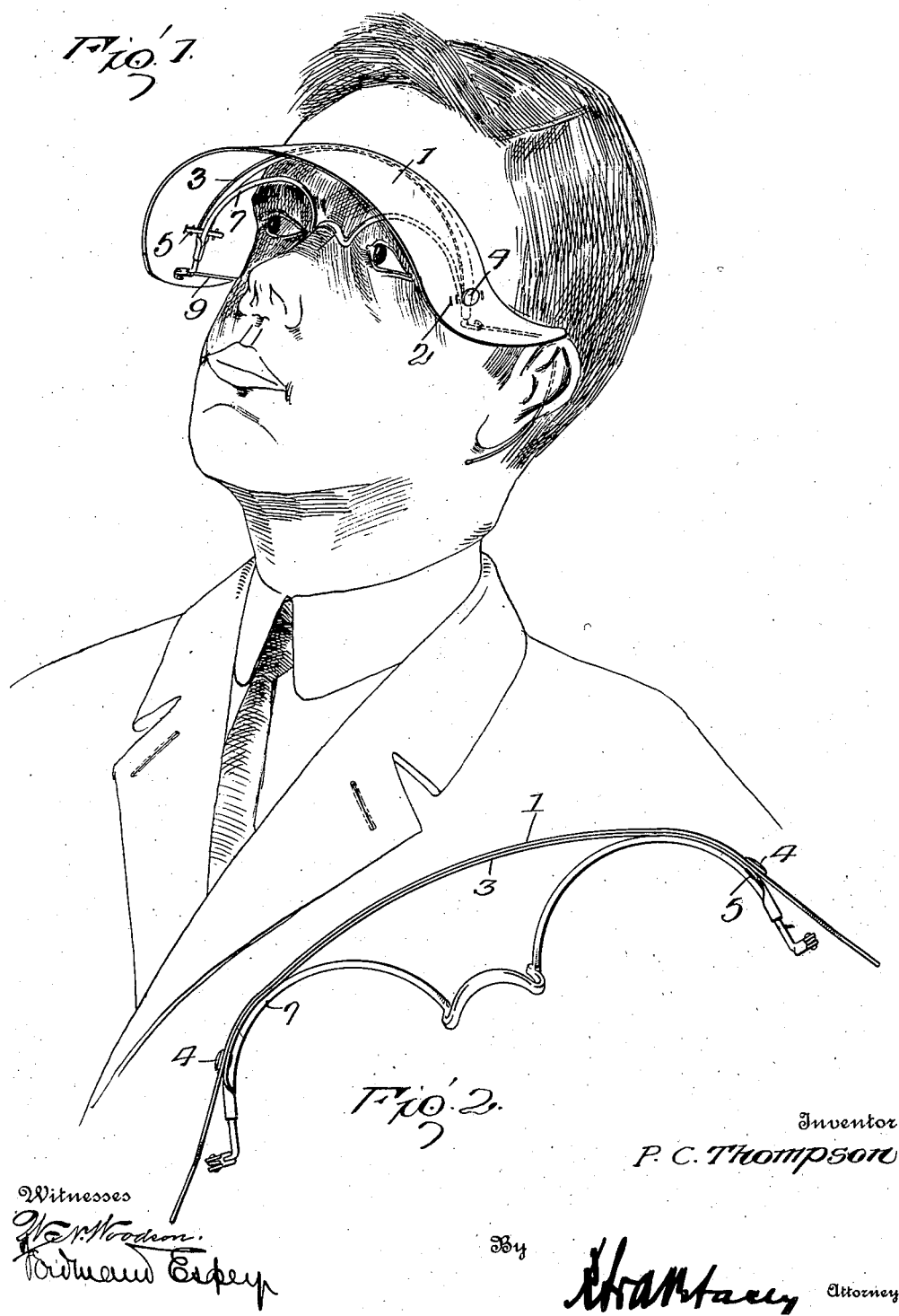
Inventor
P. C. Thompson

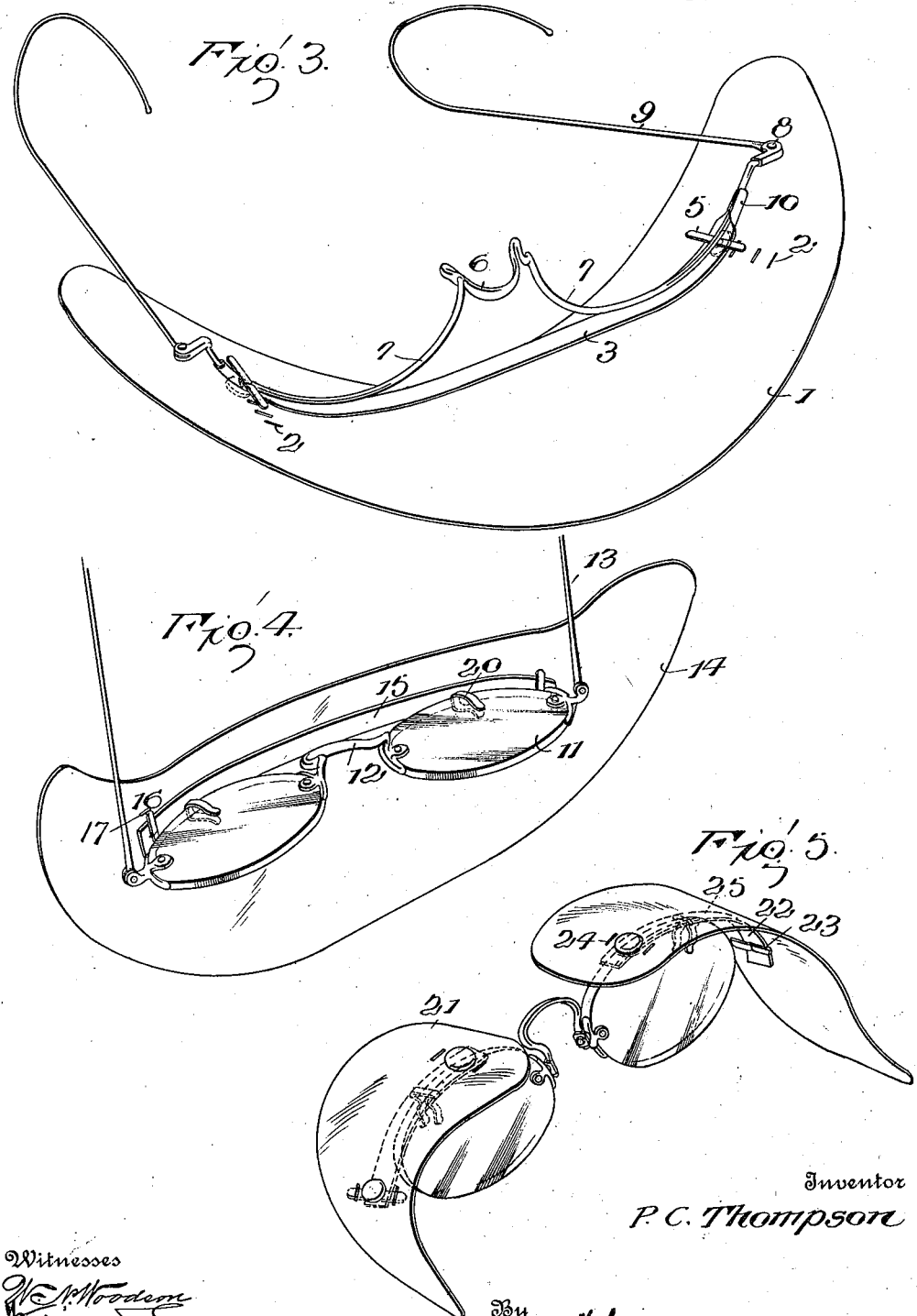

UNITED STATES PATENT OFFICE.

PRESSLEY C. THOMPSON, OF BRISTOL, TENNESSEE.

EYE-SHADE.

1,166,493. Specification of Letters Patent. Patented Jan. 4, 1916.

Application filed October 20, 1914. Serial No. 867,682.

*To all whom it may concern:*

Be it known that I, PRESSLEY C. THOMPSON, a citizen of the United States, residing at Bristol, in the county of Sullivan and State of Tennessee, have invented certain new and useful Improvements in Eye-Shades, of which the following is a specification.

This invention relates to eye-shades and has as its object to provide an eye-shade which may be worn with comfort and which will not bind or compress the forehead or temples of the wearer.

Incidentally the invention aims to provide an eye-shade which will be devoid of straps or bands designed to encircle the head and will not be supported by the forehead of the wearer but upon the bridge of the nose in substantially the same manner as an ordinary pair of eye-glasses or spectacles.

Another aim of the invention is to provide an eye-shade including a shade proper and a supporting frame therefor, the supporting frame being so constructed as to permit of the shade being adjusted to conform to the contour of the wearer's forehead so that the shade may be adjusted to conform to different features.

Another aim of the invention is to so construct the frame that it will support the shade proper in proper shape and will reinforce the same, and in this connection the invention contemplates forming the supporting member of the frame of pliable material so that it may be bent to vary the curvature and width of the shade proper.

Another aim of the invention is to so construct the frame for supporting the shade and to so connect the shade with the frame as to permit of the shade being adjusted to occupy the desired position in advance of the forehead.

The invention furthermore, in one of its embodiments, provides for the provision of a supporting frame adapted for application to any ordinary pair of eye-glasses or spectacles without liability of injury to the glasses or spectacles and in such manner as to permit of ready removal of the frame and shade whenever desired.

In another embodiment of the invention, it is contemplated that the shade be formed in two parts, adapted to be independently fitted to the lenses of a pair of eye-glasses or spectacles in such a manner that the parts may also be independently adjusted.

In the accompanying drawings: Figure 1 is a perspective view of the eye-shade embodying the present invention applied. Fig. 2 is a view looking at the upper edge thereof. Fig. 3 is a perspective view looking at the inner side of the shade. Fig. 4 is a view similar to Fig. 3, illustrating a slightly modified form of the invention. Fig. 5 is a perspective view illustrating a further modification.

Corresponding and like parts are referred to in the following description and indicated in all the views of the accompanying drawings by the same reference characters.

In that form of the invention shown in Figs. 1 to 3 inclusive, the shade is indicated by the numeral 1 and may be of celluloid, or any other suitable material, and while the shade is here shown as substantially reniform in outline, it will be understood that it may be made in any other desired shape and may be, of course, of any desired size. For a purpose to be presently explained, the shade is formed near its ends with a series of longitudinally extending slits 2, each series extending in the direction of the convex and concave front and rear edges of the shade. The frame, in this form of the invention, includes a supporting member 3, preferably formed from a strip of pliable metal which is disposed against the inner or under surface of the shade 1 and conforms to the transverse curvature of the shade, the strip being secured to the shade by two-pronged headed securing elements, the heads of which are indicated by the numeral 4 and the prongs by the numeral 5, the prongs of the securing elements being inserted selectively through the slits 2 and openings formed in the strip 3 adjacent the ends thereof. At this point it will be understood that inasmuch as the strip is pliable, the curvature and width of the shade may be varied by exerting a lateral pressure or a pulling force against the end portions of the said strip, so as to vary the curvature thereof. It will also be understood that the strip may be adjusted with relation to the concave edge of the shade so as to occupy a position the desired distance from the said edge. The purpose of providing this adjustment will be presently more fully pointed out. In this form of the invention the supporting member or strip 3 is mounted upon a frame member including a nose piece 6 and spaced bowed portions 7 located at opposite sides of the said nose piece. The portions 7 are bowed or arched upwardly and have pivoted to their ends, as at 8, the inner ends of bows 9 which are to be engaged behind the ears of the wearer, in the same manner as the bows of a pair of spectacles. In order that the supporting member or strip 3 may be supported upon the bowed portions 7 of the frame member, just described, the said strip at its ends has its edge portions overlapped to form terminal sleeves 10 which slidably fit the said bowed portions 7. It will now be understood that, inasmuch as the ends of the strip 3 slidably fit the bowed portions 7, the said sleeves 10 may be slid toward or away from the nose piece 6 when the intermediate portion of the strip is bowed to adjust the transverse curvature of the shade 1, and consequently it is not necessary to bend or otherwise vary the curvature of the said portions 7. It will furthermore be apparent that if it is desired to shade the eyes from light coming from overhead, the sleeves 10 may be slid in a direction away from the nose piece 6 and toward the ends of the bowed portions 7 so that the strip 3 will have but a slight curvature and the shade will extend entirely across and close to the forehead of the wearer, or, if, on the other hand, it is desired to protect the eyes from light coming from one side or the other of the wearer of the shade, the sleeves may be slid toward the nose-piece, the strip 3 at the same time being more or less bowed in a forward direction so that the shade proper will be acutely bent and will be brought close to the side of the forehead. Furthermore, by reason of this adjustment, the concave edge of the shade may be positioned a greater or less distance in advance of the forehead, so as to provide for ventilation. It will be apparent also that this latter adjustment, or, in other words, the spacing of the concave edge of the shade from the forehead, may be accomplished by inserting the prongs 5 of the securing elements through one or another of the slits 2. The several adjustments also permit of the shade being adapted to conform to different features and to suit the comfort of the wearer.

In that form of the invention shown in Fig. 4 of the drawings, the shade and its frame are adapted for application to any ordinary pair of eye-glasses or spectacles, and, in the said figure, the device is illustrated as applied to a pair of spectacles, the lenses of which are indicated by the numeral 11, the nose-piece by the numeral 12, and the bows by the numeral 13. In this figure, the eye-shade proper is indicated by the numeral 14 and the frame for supporting the same comprises a supporting member 15, corresponding substantially to the member 3 in the previously described form of the invention. The supporting member or strip 15 is secured to the inner side of the shade 14 by means of fastening elements 16 which correspond to the fastening elements previously described, and which have their prongs inserted selectively through series of slits 17 formed in the shade and through openings formed in the strip near its ends. In order to attach the supporting member 15, the strip is provided upon its inner or concave side and adjacent each end with a lens clip 20, these lens clips being preferably of resilient metal and including each a connecting portion secured to the strip 15 and resilient fingers which have a tendency to spring toward each other and which are, therefore, adapted to frictionally engage over the upper edges of the lenses or lens frames of the spectacles.

In that form of the invention shown in Fig. 5 of the drawings, the shade proper is formed in two sections, each indicated by the numeral 21 and, while these sections may be of any desired outline, they are preferably substantially of an outline corresponding to one-half of the shade 1. Disposed against the inner side of each of the shades 21 is a supporting strip 22 of pliable metal, the strip being secured in place by means of fastening elements 23, corresponding to the fastening elements previously described, and having their prongs inserted through series of slits 24 in the said shade and through openings in the respective strip, it being understood that each strip is secured by two of the said elements, one located at each end thereof. Between its ends, each strip is provided with a lens clip, which corresponds to the clip 20, previously described. In the use of this form of the invention, the strips 22 are bent to conform to the peripheral curvature of the lenses to which the shades are to be applied and they are then placed in position upon the lenses, by engaging the clips 25 over the upper edges of the lenses. It will be understood, of course, that the clips may be moved slidably along the periphery of the lenses so as to adjust the shades to the desired positions thereon, and it will of course be apparent that either or both shades may be employed at one time, as may be found desirable.

Having thus described the invention, what is claimed as new is:

1. In a device of the class described, a shade, a supporting member extending longitudinally beneath the shade, and means upon the said member constructed for slidable and adjustable engagement with a support.

2. In a device of the class described, a shade, and a support therefor comprising a strip of pliable material to which the shade is secured, the strip extending longitudinally of the shade and the shade being adjustable upon the strip transversely of the length of the strip.

3. In a device of the class described, a shade, a support therefor including a pliable strip, the shade being provided with a series of apertures, and a securing element fastened through the strip and selectively through the apertures.

4. In a device of the class described, a shade, a pliable strip disposed against the under side of the shade and secured thereto and adapted to be bent to determine the transverse curvature of the shade, and means supporting said strip.

5. In a device of the class described, a shade, a pliable strip disposed against the under side of the shade, the strip extending longitudinally beneath the shade and being adjustable in a direction from front to rear of the shade, and means for supporting said strip.

6. In a device of the class described, a shade, a strip disposed against one side of the shade, the said strip being pliable and adapted to be bent whereby to determine the transverse contour of the shade, a frame for supporting the strip, and means carried by the strip and adjustable upon the said frame whereby to provide for supporting the strip after it has been bent.

7. In a device of the class described, a shade, a strip of pliable material disposed against one side of the shade and secured thereto and extending longitudinally thereof, a frame for supporting the strip, and means at the ends of the strip slidably engaging the said frame.

In testimony whereof I affix my signature in presence of two witnesses.

PRESSLEY C. THOMPSON. [L. S.]

Witnesses:
GEO. H. CALDWELL,
JOHN L. EVANS.